(12) United States Patent
Baarman et al.

(10) Patent No.: US 6,798,080 B1
(45) Date of Patent: Sep. 28, 2004

(54) HYDRO-POWER GENERATION FOR A WATER TREATMENT SYSTEM AND METHOD OF SUPPLYING ELECTRICITY USING A FLOW OF LIQUID

(75) Inventors: David W. Baarman, Fennville, MI (US); Wesly J. Bachman, Auburn, IL (US); John J. Lord, Springfield, IL (US)

(73) Assignee: Access Business Group International, Ada, MI (US)

( * ) Notice: Subject to any disclaimer, the term of this patent is extended or adjusted under 35 U.S.C. 154(b) by 247 days.

(21) Appl. No.: 09/680,345

(22) Filed: Oct. 5, 2000

Related U.S. Application Data

(60) Provisional application No. 60/157,760, filed on Oct. 5, 1999.

(51) Int. Cl.$^7$ ............................ F03B 13/10; F03D 1/02; B64C 11/44; B63H 1/26; F01D 1/02
(52) U.S. Cl. ............................ 290/43; 290/52; 290/54; 415/1; 415/2.1; 415/905; 416/20 R; 416/223 R
(58) Field of Search ...................... 239/265.11–265.43, 239/380–389, 86–92, 76, 95–96, 435; 415/1, 2.1, 8, 25.1, 905, 906, 916, 52.1; 416/6, 20 R, 90 R, 91, 92, 90 A, 223 R–223 B, DIG. 4; 290/43, 52, 54; 60/639, 911, 200.1, 640, 204, 221

(56) References Cited

U.S. PATENT DOCUMENTS

| | | |
|---|---|---|
| 692,714 A | 2/1902 | Sala et al. |
| 1,560,535 A | 11/1925 | Burton |
| 2,436,683 A | 2/1948 | Wood, Jr. .................... 290/52 |
| 2,501,696 A | 3/1950 | Souczek ...................... 290/43 |
| 2,663,541 A | 12/1953 | Green ............................ 253/3 |
| RE24,179 E | 7/1956 | Breaux et al. ................. 290/4 |
| 2,893,926 A | 7/1959 | Worthen et al. ............. 202/82 |

(List continued on next page.)

FOREIGN PATENT DOCUMENTS

DE    198 08 328 A 1    9/1999

OTHER PUBLICATIONS

Electric Lamps (a brief history since Edison), Martin Harriman, Tuesday, Jun. 27, 1995, http://fins.actwin.com/aquatic–plants/month.9506/msg00258.html.*
Ballast—General Information, www.dscp.dla.mil/gi/general/lightcat/FLBAL%20gen.pdf.*
Electronic Ballast Q & A, http://www.universalballast.com/techSupport/trouble_shooting/elct.*
Ballast Evolution—Gone Low Profile, Greg Bennorth, http://www.universalballast.com/literature/evolution.html.*
History and problems of T12 fluorescent lamps, http://ateam.lbl.gov/Design–Guide/DGHtm/historyandproblemsoft12fluorescentlamps.htm.*
UV Systems, Inc. FAQ—General Questions, http://www.u-vsystems.com/FAQ.asp?faq.*

*Primary Examiner*—Nicholas Ponomarenko
*Assistant Examiner*—Pedro J. Cuevas
(74) *Attorney, Agent, or Firm*—Brinks Hofer Gilson & Lione

(57) ABSTRACT

A hydro-power generation system for use in conjunction with a water treatment system is disclosed. The embodiments of the hydro-power generation system include an impeller rotatably positioned in a housing. The impeller is rotatably coupled with a generator. When water flows through the water treatment system, water flows to the hydro-power generation system and acts on the impeller causing rotation thereof. The rotation of the impeller results in the generation of electricity for the water treatment system by the generator. Other embodiments of the hydro-power generation system include a rotor rotatably positioned in a conduit through which water flows. The flowing water causes the rotor to rotate. The rotor operatively cooperates with a surrounding stator. As the rotor rotates within the stator electricity is generated for the water treatment system.

53 Claims, 9 Drawing Sheets

U.S. PATENT DOCUMENTS

| | | | | |
|---|---|---|---|---|
| 3,209,156 A | | 9/1965 | Struble, Jr. | 290/54 |
| 3,635,764 A | | 1/1972 | Setser et al. | 136/86 |
| 3,678,285 A | | 7/1972 | Griffith | 290/40 |
| 3,845,291 A | | 10/1974 | Portyrata | 240/26 |
| 3,913,399 A | | 10/1975 | Sheeks | 73/229 |
| 3,986,787 A | | 10/1976 | Mouton, Jr. et al. | 415/7 |
| 4,047,426 A | | 9/1977 | Maruyama et al. | 73/118 |
| 4,052,858 A | | 10/1977 | Jeppson | 60/648 |
| 4,057,270 A | * | 11/1977 | Lebost | 290/54 |
| 4,075,500 A | | 2/1978 | Oman et al. | 290/55 |
| 4,246,753 A | | 1/1981 | Redmond | 60/398 |
| 4,272,686 A | | 6/1981 | Suzuki | 290/54 |
| 4,274,009 A | | 6/1981 | Parker, Sr. | 290/43 |
| 4,276,482 A | | 6/1981 | Crockett | 290/52 |
| 4,282,444 A | | 8/1981 | Ramer | 290/52 |
| 4,293,777 A | | 10/1981 | Gamell | 290/52 |
| 4,352,025 A | | 9/1982 | Troyen | 290/54 |
| 4,364,709 A | | 12/1982 | Tornquist | 416/132 |
| 4,392,063 A | | 7/1983 | Lindquist | 290/54 |
| 4,393,991 A | | 7/1983 | Jeffras et al. | 239/102 |
| 4,443,707 A | | 4/1984 | Scieri et al. | 290/4 |
| 4,483,147 A | | 11/1984 | Evans et al. | 60/611 |
| 4,508,972 A | | 4/1985 | Willmouth | 290/55 |
| 4,516,033 A | | 5/1985 | Olson | 290/54 |
| 4,517,479 A | | 5/1985 | Aleem et al. | 310/54 |
| 4,524,285 A | * | 6/1985 | Rauch | 290/43 |
| 4,531,063 A | | 7/1985 | Vielmo et al. | 290/53 |
| 4,555,637 A | | 11/1985 | Irvine | 290/52 |
| 4,564,889 A | | 1/1986 | Bolson | 362/192 |
| 4,586,871 A | | 5/1986 | Glass | 415/90 |
| 4,605,376 A | | 8/1986 | Aschauer | 440/38 |
| 4,613,279 A | | 9/1986 | Corren et al. | 415/2 |
| 4,616,298 A | | 10/1986 | Bolson | 362/192 |
| 4,636,707 A | | 1/1987 | Law | 322/35 |
| 4,731,545 A | | 3/1988 | Lerner et al. | 290/54 |
| 4,740,711 A | | 4/1988 | Sato et al. | 249/52 |
| 4,746,808 A | | 5/1988 | Kaeser | 290/52 |
| 4,868,408 A | | 9/1989 | Hesh | 290/52 |
| 4,920,465 A | | 4/1990 | Sargent | 362/96 |
| 4,923,368 A | | 5/1990 | Martin | 415/202 |
| 4,936,508 A | | 6/1990 | Ingalz | 239/72 |
| 4,951,915 A | | 8/1990 | Piao | 251/14 |
| 4,960,363 A | * | 10/1990 | Bergstein | 415/3.1 |
| 4,963,780 A | | 10/1990 | Hochstrasser | 310/104 |
| 4,993,977 A | | 2/1991 | Rodler, Jr. | 440/67 |
| 5,040,945 A | | 8/1991 | Levesque | 415/124.1 |
| 5,043,592 A | | 8/1991 | Hochstrasser | 290/52 |
| 5,100,290 A | | 3/1992 | Berger | 415/60 |
| 5,102,296 A | | 4/1992 | Kimberlin | 415/186 |
| 5,118,961 A | | 6/1992 | Gamell | 290/52 |
| 5,238,030 A | | 8/1993 | Miller et al. | 141/4 |
| 5,263,814 A | | 11/1993 | Jang | 415/63 |
| 5,277,542 A | | 1/1994 | Nakanishi | 415/75 |
| 5,281,856 A | | 1/1994 | Kenderi | 290/54 |
| 5,299,447 A | | 4/1994 | Caron | 73/3 |
| 5,326,221 A | | 7/1994 | Amyot et al. | 415/191 |
| 5,332,155 A | * | 7/1994 | Jager | 239/240 |
| 5,336,933 A | | 8/1994 | Ernster | 290/55 |
| 5,349,985 A | | 9/1994 | Fischer | 137/607 |
| 5,389,821 A | | 2/1995 | Moulliet | 290/1 |
| 5,511,942 A | | 4/1996 | Meier | 415/220 |
| 5,626,461 A | | 5/1997 | Rose | 415/206 |
| 5,659,205 A | * | 8/1997 | Weisser | 290/52 |
| 5,780,935 A | | 7/1998 | Kao | 290/52 |
| 5,793,130 A | | 8/1998 | Anderson | 310/50 |
| 5,798,572 A | | 8/1998 | Lehoczky | 290/54 |
| 5,820,102 A | | 10/1998 | Borland | 251/144 |
| 5,820,339 A | | 10/1998 | Trojahn | 415/202 |
| 5,845,757 A | | 12/1998 | Csonka | 192/105 |
| 5,934,877 A | * | 8/1999 | Harman | 416/223 R |
| 5,982,059 A | | 11/1999 | Anderson | 310/50 |
| 5,988,210 A | | 11/1999 | Komiya et al. | 137/487.5 |
| 6,011,334 A | * | 1/2000 | Roland | 310/86 |
| 6,012,474 A | | 1/2000 | Takamoto et al. | 137/14 |
| 6,013,955 A | | 1/2000 | dos Santos Costa | 290/54 |
| 6,036,333 A | | 3/2000 | Spiller | 362/192 |
| 6,047,104 A | * | 4/2000 | Cheng | 388/835 |
| 6,093,401 A | | 7/2000 | Shanbrom | 424/195.1 |
| 6,126,385 A | * | 10/2000 | Lamont | 415/4.5 |
| 6,126,391 A | | 10/2000 | Atraghji et al. | 415/115 |
| 6,196,793 B1 | | 3/2001 | Braaten | 415/191 |
| 6,208,037 B1 | | 3/2001 | Mayo, Jr. | 290/54 |
| 6,281,595 B1 | * | 8/2001 | Sinha et al. | 290/40 A |
| 6,309,179 B1 | * | 10/2001 | Holden | 415/202 |
| 6,406,251 B1 | | 6/2002 | Vauthier | 415/7 |
| 6,431,820 B1 | * | 8/2002 | Beacock et al. | 415/1 |
| 6,431,821 B1 | * | 8/2002 | Feltenberger et al. | 415/3.1 |
| 2002/0041100 A1 | | 4/2002 | Yumita et al. | |
| 2002/0047374 A1 | | 4/2002 | Yumita | |
| 2002/0113442 A1 | | 8/2002 | Yumita | |

* cited by examiner

HYDRO-POWER GENERATION FOR A WATER TREATMENT SYSTEM AND METHOD OF SUPPLYING ELECTRICITY USING A FLOW OF LIQUID

This application claims the benefit under 35 U.S.C. §119(e) of Provisional U.S. patent application Serial No. 60/157,760, filed on Oct. 5, 1999.

FIELD OF THE INVENTION

The present invention relates generally to a water treatment system and, more particularly, to a method and system for providing electrical power to a water treatment system through hydroelectric power generation.

BACKGROUND OF THE INVENTION

Over the past several years, people have become more health conscious when it comes to consuming water from public water supplies or private wells. Unfortunately, in today's increasingly polluted world, there is no such thing as naturally pure water. Water supplies contain microbiological and chemical contaminants that can be found in nature or are the result of human activity. As water flows in streams, resides in lakes, and filters through layers of soil and rock in the ground, the water dissolves or absorbs naturally occurring contaminants. In addition, human-originated sources of water contaminants can result from rainfall runoff, snowmelt and underground migration from disposal sites.

A clean, constant supply of drinking water is essential to every community. People in large cities frequently drink water that comes from surface water sources, such as lakes, rivers, and reservoirs. Sometimes these sources are close to the community and other times, drinking water is obtained from sources many miles away. In rural areas, people are more likely to drink ground water that is pumped from public or private wells. These wells tap into aquifers that may be only a few miles wide, or may span the borders of many states. Although efforts are made to limit the levels of contaminants in ground water and surface water, some level of contaminants is present in all drinking water.

As a result of the increased awareness of water contamination, the public desires to have the water it consumes purified. Several different types of water treatment systems have been developed to increase the purity of drinking water for the consuming public. These systems typically remove some or all of the contaminants found in drinking water supplies in an effort to provide water free of contamination. Several of these systems use a carbon-based filter unit and an ultraviolet (UV) light unit to filter and decontaminate the water before being dispensed for consumption. The carbon-based filter unit uses inert material to filter out particulate and organic contaminants. Ultraviolet radiation that is emitted from the ultraviolet light unit is used to neutralize harmful microorganisms present in the water.

In order to energize the ultraviolet light unit and a plurality of other systems in the water treatment system, a power source is required. Conventional water treatment systems use power from a standard electrical outlet or a battery power source to provide the energy necessary to drive all of the components in the water treatment system, including the ultraviolet light unit. In the case of water treatment systems powered by electrical outlets, the system has limited portability and ceases to operate when there is an interruption in the electrical outlet power supply. Water treatment systems operated from battery power sources contain only a finite supply of energy that is depleted through operation or storage of the water treatment system and replacement batteries must be readily available to keep the water treatment system operable. If a longer-term battery power source is desired, larger batteries are required that can add considerable weight and size to the water treatment system.

Some existing water treatment systems are capable of using either the standard electrical outlets or the battery power sources where the battery power source can be replenished by the electrical outlet power source. Although these water treatment systems do not require replacement batteries, the capacity and size of the batteries dictate the length of operation of the water treatment system while operating on the battery source. An electrical outlet source must also be utilized on a regular basis to replenish the batteries. In addition, these water treatment systems require additional electrical circuits and components to operate from the two different power sources.

For the foregoing reasons, a need exists for a water treatment system containing an internal power supply that requires no external electrical power source and can produce power to operate the water treatment system.

SUMMARY OF THE INVENTION

The present invention discloses a hydro-power generation system for use in conjunction with a water treatment system that overcomes problems associated with the prior art. The embodiments of the hydro-power generation system require no external power source to provide power for use by the water treatment system. The hydro-power generation system is operable to produce electricity when water is flowing through the water treatment system.

One embodiment of the hydro-power generation system includes a nozzle, a housing and an outlet. During operation, water flows from the water treatment system into the nozzle. The nozzle forces the flowing water through the housing to the outlet. The housing is formed to accept an impeller that is in fluid communication with water flowing through the housing. The flowing water acts on the impeller causing the impeller to rotate. The impeller is fixedly coupled to a generator. The rotation of the impeller rotates a portion of the generator thereby producing electricity for the water treatment system.

Another embodiment of the hydro-power generation system includes a housing, an impeller, a nozzle, an outlet and a generator. The housing includes an airspace within which the impeller that is capable of rotating is positioned. The nozzle penetrates the housing and provides an inlet for water. The nozzle operates to provide a stream of water that is directed at the impeller to induce the rotation of the impeller. The outlet is coupled to the housing to channel water directed at the impeller out of the housing. The generator is coupled with the impeller such that rotation of the impeller induces the generation of electricity by the generator.

Yet another embodiment of the hydro-power generation system includes a housing, a rotor and a stator. The housing includes an inlet and an outlet and forms a conduit for the passage of water therethrough. The rotor is positioned within the housing and capable of rotation such the rotor is rotated by the flow of water through the housing. The stator is positioned to surround the rotor such that rotation of the rotor induces the production of electricity.

A method of supplying electricity to a water treatment system using water that is subject to treatment by the water treatment system is described by another embodiment. The method comprises providing a housing that includes an inlet and an outlet, and supplying a flow of water to the inlet of the housing. The water flows through the housing to the outlet. The method further comprises rotating a rotor that is positioned in the housing. The position of the rotor in the housing is such that a stator surrounds the rotor. In addition, the method comprises generating electricity with the rotor and the stator. The rotation of the rotor induces the generation of electricity.

Yet another embodiment describes a method of supplying electricity to a water treatment system using water that is subject to treatment by the water treatment system. This method includes providing a housing having an airspace and supplying a flow of water to a nozzle. In addition, the method includes directing the water sprayed from the nozzle at an impeller that is positioned within the airspace and is capable of rotation. The method continues by rotating the impeller and a rotor that is fixedly coupled to the impeller with the water sprayed from the nozzle. The rotor is cooperatively operable with a stator to form a generator that is generating electricity when the rotor rotates.

The presently preferred embodiments can be readily adapted for use in a variety of water treatment systems that require a power source, such as portable water treatment systems, faucet-mounted water treatment systems, undercounter water treatment systems, whole house water treatment systems and remote location water treatment systems. Those skilled in the art would also recognize that the hydro-power generation system could be adapted for use with various other systems that require electricity during activities that include flowing water or other fluids.

Since the presently preferred water treatment system contains a self-sustaining power supply, the standard electrical outlet power supply is not required. In addition, since the water treatment system is capable of supplying its own power needs, it can also provide a power source for charging an energy storage device used for the water treatment system. The energy storage device may augment operation by providing power for such things as indicators and monitors during times when the water is not flowing. In the presently preferred embodiments, the hydro-power generation system may provide power for initial power requirements, UV lamp starting, indicators and monitoring devices.

These and other features and advantages of the invention will become apparent upon consideration of the following detailed description of the presently preferred embodiments, viewed in conjunction with the appended drawings. The foregoing discussion has been provided only by way of introduction. Nothing in this section should be taken as a limitation on the following claims, which define the scope of the invention.

DETAILED DESCRIPTION OF THE PRESENTLY PREFERRED EMBODIMENTS OF THE INVENTION

The exemplary embodiments of the invention are set forth below with reference to specific configurations, and those skilled in the art would recognize various changes and modifications could be made to the specific configurations while remaining within the scope of the claims. The presently preferred embodiments may be used with any water treatment system that requires a power supply and includes a water flow; however, the embodiments are designed for a water treatment system for residential or portable use. Those skilled in the art would also recognize that the embodiments could be used with fluids other than water and use of the term "water" and "hydro" should not be construed as a limitation.

Figure 1:
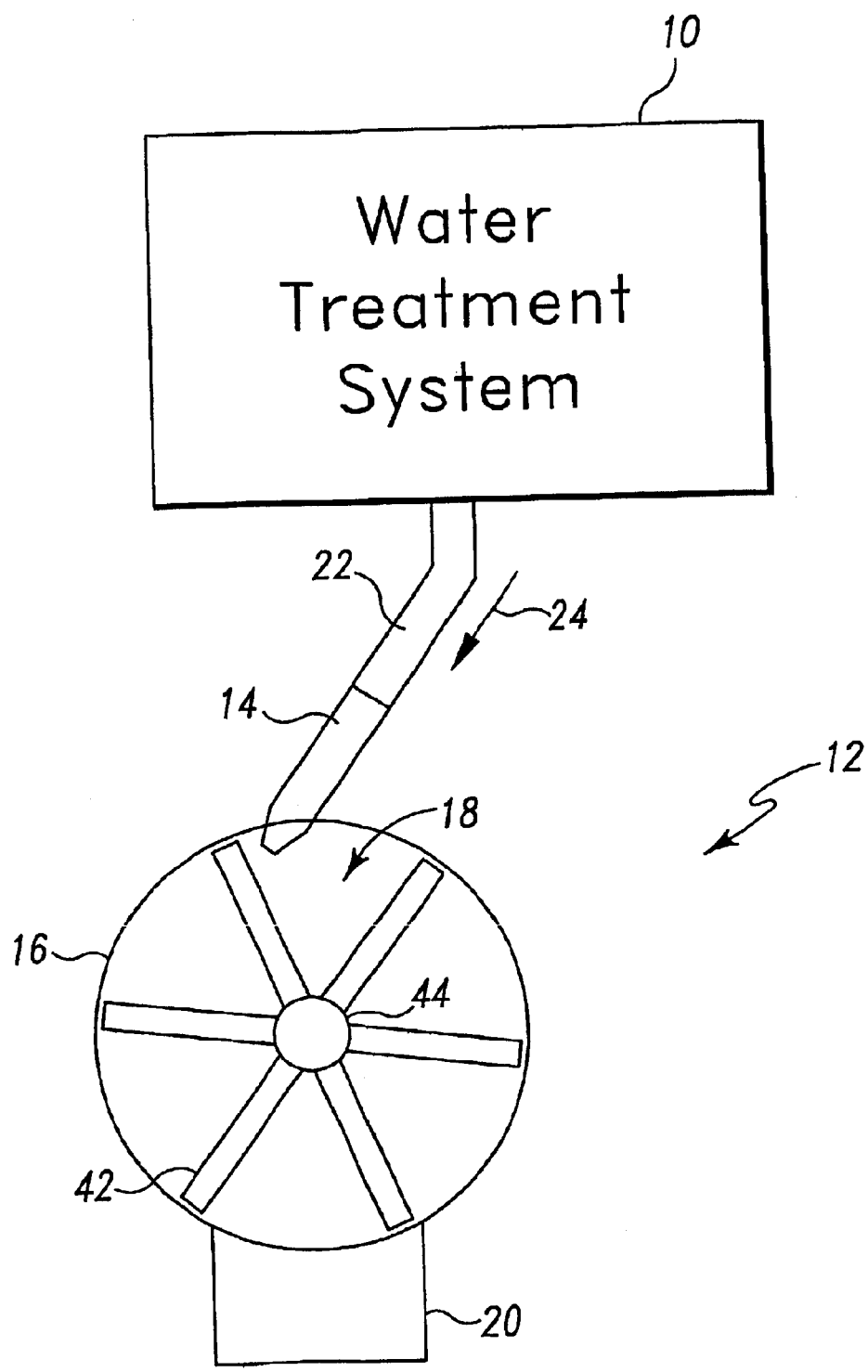
FIG. 1 illustrates a water treatment system coupled to one embodiment of the hydro-power generation system.

FIG. 1 is a side view of a water treatment system 10 connected with a preferred hydro-power generation system 12. In this embodiment, the hydro-power generation system 12 includes a nozzle 14, a housing 16, an impeller 18 and a housing outlet 20. The nozzle 14 is coupled with the water treatment system 10 by a conduit 22. The conduit 22 may be formed of PVC plastic or similar material and may be coupled to the nozzle 14 by threaded connection, friction fit or some other similar connection mechanism.

During operation, pressurized water flows from the water treatment system 10 into the hydro-power generation system 12 via the nozzle 14 as illustrated by arrow 24. The nozzle 14 is coupled with the housing 16 such that water flows through the nozzle 14 and is forced through the housing 16 to the housing outlet 20. In alternative embodiments, the hydro-power generation system 12 may be positioned within the water treatment system 10 or positioned to receive a supply of pressurized water before the water enters the water treatment system 10.

Figure 2:
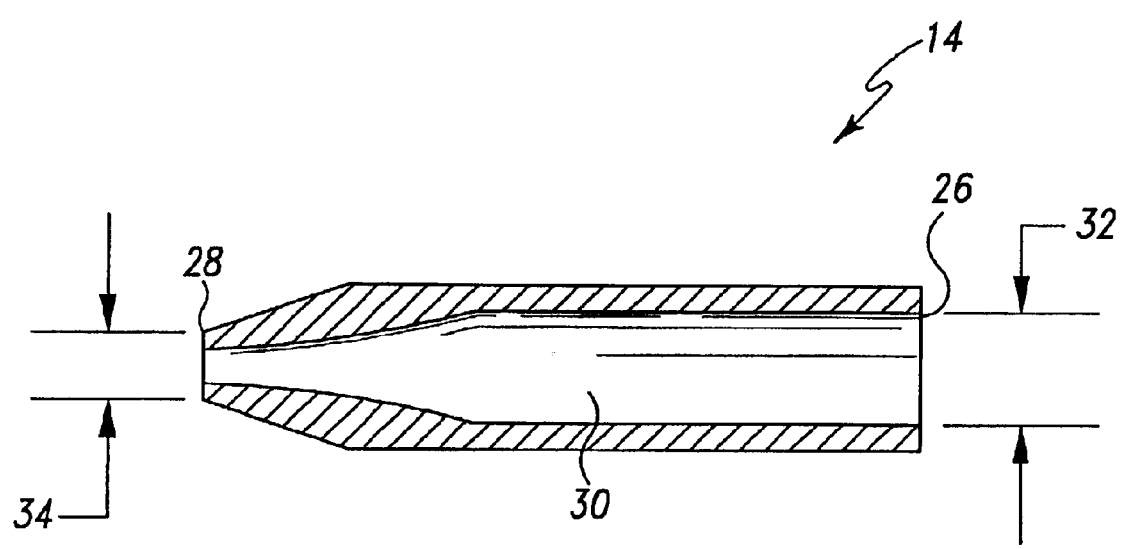
FIG. 2 illustrates a cross section of one embodiment of the nozzle illustrated in FIG. 1.

FIG. 2 illustrates a cross section of one embodiment of the nozzle 14. The preferred nozzle 14 is a sonic nozzle that increases the velocity of pressurized water flowing therethrough. In this embodiment, the nozzle 14 is capable of increasing the velocity of the water to sub-sonic speed. The nozzle 14 is formed of stainless steel or some other similar rigid material and includes a nozzle inlet 26 and a nozzle outlet 28. The nozzle inlet 26 is coupled to the water treatment system 10 as previously discussed. The nozzle outlet 28 is coupled to the housing 16 by friction fit, snap-fit, threaded connection or some other similar coupling mechanism capable of forming a watertight connection therebetween. The nozzle 14 may penetrate the housing 16 in any location that provides proper alignment of the nozzle 14 with the impeller 18 as will be hereinafter discussed.

The nozzle 14 includes a passageway 30 that provides for the flow of water therethrough. The passageway 30 is formed to be a first predetermined diameter 32 at the nozzle inlet 26 and a second predetermined diameter 34 at the nozzle outlet 28. In this embodiment, the second predetermined diameter 34 is about twenty-six percent of the first predetermined diameter 32. The passageway 30 remains the first predetermined diameter 32 for a predetermined length of the nozzle 14. The remaining portion of the passageway 30 is conically shaped by uniformly tapering the passageway 30 to the second predetermined diameter 34. In this embodiment, the passageway 30 of the nozzle 14 tapers at an angle of approximately 18 degrees between the first predetermined diameter 32 and the second predetermined diameter 34.

The configuration of the passageway 30 determines the velocity of the water exiting from the nozzle 14. In addition, the velocity of the water at the nozzle outlet 28 is dependent on the pressure of the water source and the back pressure downstream of the nozzle 14. A desirable predetermined range of the velocity at the nozzle outlet 28 may be determined using an expected range of pressure provided by the water treatment system 10 (illustrated in FIG. 1) at the nozzle inlet 26. For example, in a household water system, the pressure of the water supply is in a range of about twenty to sixty pounds-per-square-inch (PSI). The passageway 30 also provides a continuous and uniform stream of water at the nozzle outlet 28. During operation water flowing through the nozzle 14 flows into the housing 16 within a predetermined range of high velocity with a predetermined trajectory.

Referring back to FIG. 1, the housing 16 forms a conduit that may be composed of plastic or some other similar waterproof material capable of forming a rigid passageway for water. In this embodiment, the housing 16 includes a translucent portion as illustrated in FIG. 1 to allow viewing of the interior of the housing 16. The housing 16 is formed to encompass the impeller 18 that is in fluid communication with water as the water flows through the housing 16 after exiting the nozzle outlet 28.

The impeller 18 includes a plurality of blades 42 that are rigidly fastened to a hub 44. The blades 42 are positioned in the housing 16 such that water flowing from the nozzle 14 impinges upon the blades 42 of the impeller 18 at a predetermined angle. The predetermined angle is determined based on the expected pressure of the water at the nozzle inlet 26, the back pressure at the nozzle outlet 28 and the desired revolutions-per-minute (RPM) of the impeller 18. During operation, the flowing water acts on the impeller 18 causing it to rotate in a single direction within the housing 16. As discussed in detail below, as the impeller 18 rotates, this embodiment of the hydro-power generation system 12 converts the energy in the flowing water to rotational energy, which is then converted to electricity. In this embodiment, the impeller 18 is submerged in the water flowing through the housing 16.

Figure 3:
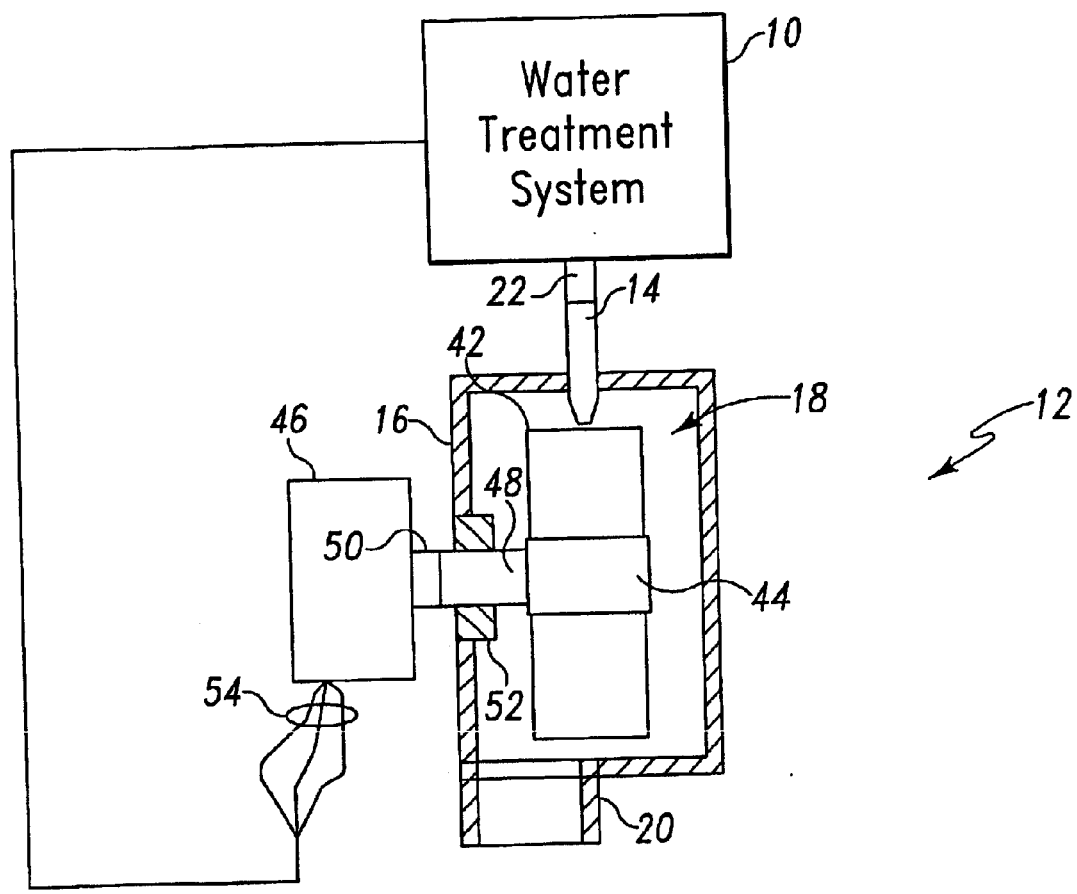
FIG. 3 illustrates the water treatment system and the hydro-power generation system illustrated in FIG. 1 rotated 90 degrees with a portion of the hydro-power generation system sectioned away.

FIG. 3 illustrates the embodiment depicted in FIG. 1 rotated 90 degrees with a portion of the housing 16 sectioned away. As illustrated, the impeller 18 is coaxially fastened to a generator 46 by a longitudinal extending shaft 48. The shaft 48 may be stainless steel or some other similar rigid material that is fixedly coupled with the impeller 18. The hub 44 of the impeller 18 is coaxially coupled to one end of the shaft 48 and a generator shaft 50, which is part of the generator 46, is coaxially coupled to the other end. The rigid coupling of the shaft 48 to the impeller 18 and the generator 46 may be by welding, press-fit or other similar rigid connection.

The rotatable shaft 48 longitudinally extends to penetrate the housing 16 through a watertight seal 52 made of rubber or other similar material. The watertight seal 52 is coupled to the housing 16 and is formed to allow the shaft 48 to rotate freely without the escape of water from within the housing 16. The shaft 48 longitudinally extends to the generator 46 that is positioned adjacent the housing 16. Although not illustrated, the outer surface of the generator 46 may be coupled to the housing 16 by, for example, nuts and bolts, rivets or other similar mechanism capable of fixedly coupling the housing 16 and generator 46.

During operation, as water flows through the housing 16 and the impeller 18 rotates, shafts 48, 50 correspondingly rotate, causing electricity to be produced from the generator 46. In an alternative embodiment, a magnetic coupler (not shown) is used in place of the shaft 48 to eliminate the need for penetration of the housing 16. In this embodiment, the impeller 18 includes magnets with sufficient magnetic strength to rigidly couple with similar magnets positioned on the generator shaft 50 outside the housing 16. During operation, when the impeller 18 rotates, the magnetic attraction of the magnets oriented on the impeller and the magnets oriented on the generator shaft 50 cause rotation of the generator shaft 50 thereby generating electricity from the generator 46.

In this embodiment, the generator 46 may be a permanent magnet generator capable of generating direct current (DC) or alternating current (AC). In an alternative embodiment, the generator 46 may be capable of generating both AC and DC current. The electricity is transferred from the generator 46 by a plurality of conductors 54 that may be wires, busses or other similar materials capable of conducting electricity. The voltage level of the electricity produced is a function of the revolutions-per-minute of the impeller 18. As previously discussed, the velocity of the water flowing from the nozzle 14 may be designed within a predetermined range thereby controlling the voltage output of the electricity generated by the generator 46.

The direct or alternating current produced by this embodiment may be used to power the water treatment system 10 and may also be used to charge an energy storage device (not shown) such as, for example, a battery or capacitors. The rotation of the impeller 18 or the duration of the electricity being produced may also provide a mechanism for flow-based measurements such as, flow rates or the quantity of water that has flowed through the water treatment system 10. The rotation of the impeller 18 or the duration of the electricity being produced may be combined with the back electromagnetic force (EMF) of the generator 46 to provide the flow-based measurements. Those skilled in the art would recognize that the hydro-power generation system 12 may also be used in other systems besides the water treatment system 10.

Figure 4:
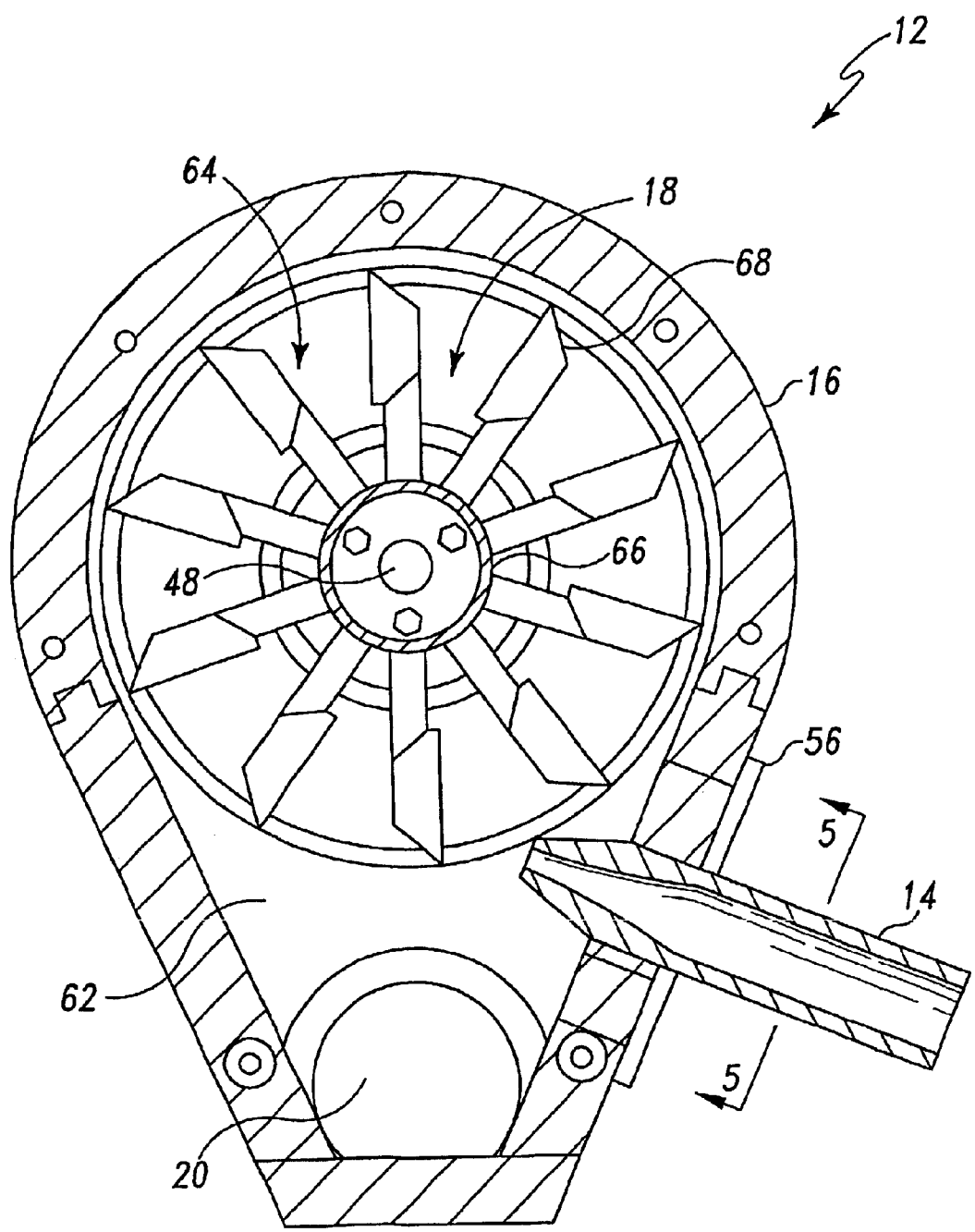
FIG. 4 illustrates a cross-section of another embodiment of the hydro-power generation system.

FIG. 4 illustrates a cross sectional view of another embodiment of the hydro-power generation system 12. This embodiment is similarly coupled to the water treatment system 10 as in the embodiment illustrated in FIG. 1 and includes a nozzle 14, a housing 16, an impeller 18 and a housing outlet 20. Similar to the previously discussed embodiment, the nozzle 14 provides water at high velocity that is directed at the rotatable impeller 18. However, in this embodiment, the impeller 18 is not submerged in water within the housing 16 during operation. As such, the water from the nozzle 14 forms a stream that is sprayed at the impeller 18.

The nozzle 14 may be a sonic nozzle similar to the previously discussed nozzle 14 illustrated in FIG. 2. The nozzle 14 penetrates the housing 16 and is coupled thereto by a mounting plate 56. The mounting plate 56 is positioned adjacently contacting the outer surface of the housing 16. Those skilled in the art would recognize that other methods exist that could be used to couple the nozzle 14 with the housing 16.

Figure 5:
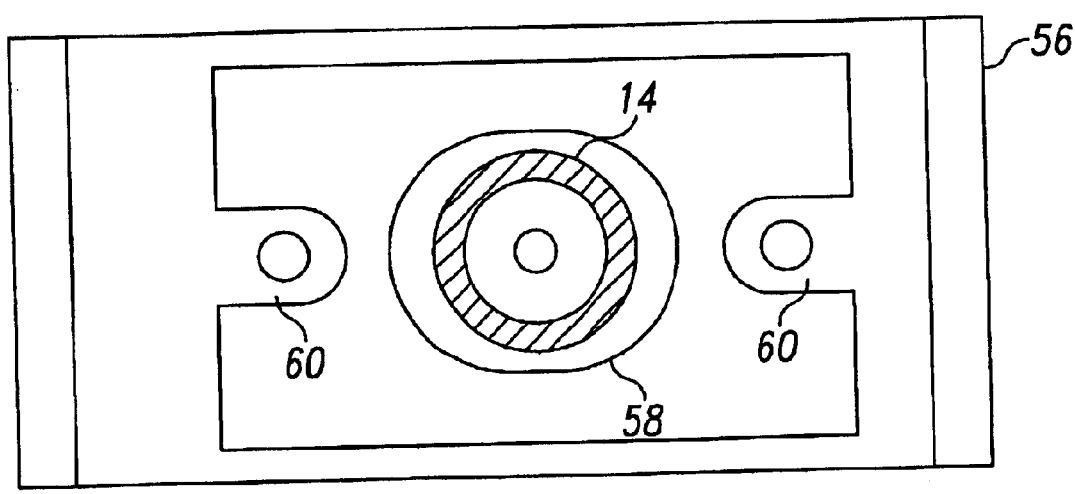
FIG. 5 illustrates a cross-section of the nozzle illustrated in FIG. 4 taken along line 5—5.

FIG. 5 illustrates a cross sectional view of the nozzle 14 mounted in the mounting plate 56 of this embodiment. The mounting plate 56 includes a longitudinal slot 58 and a pair of ears 60 that allow adjustment of the nozzle 14 to an optimal position in relation to the impeller 18. In this embodiment, the nozzle 14 may be fixedly mounted to the housing 16 when the optimal position is achieved by inserting threaded screws in the ears 60. In alternative embodiments, the mounting plate 56 provides a single predetermined desired position of the nozzle 14 when the fasteners such as, for example, threaded screws, rivets or pins fixedly mount the mounting plate 56 on the housing 16.

Referring again to FIG. 4, the desired position of the nozzle 14 is such that the nozzle 14 longitudinally extends into the housing 16. The housing 16 of this embodiment includes a housing cavity 62 that is defined by the inner walls of the housing 16 as illustrated in FIG. 4. The housing cavity 62 is an air space that includes the impeller 18 positioned therein. During operation, water is sprayed from the nozzle 14 into the housing cavity 62 with a predetermined trajectory to strike the impeller 18 at a predetermined angle. The predetermined angle is based on the desired RPM of the impeller 18 and the range of the pressure of water supplied to the nozzle 14 from the water treatment system 10. The cooperative operation of the nozzle 14 and the impeller 18 are not limited to operation with pressurized water and other fluids such as, for example, air could similarly be utilized.

As further illustrated in FIG. 4, the impeller 18 includes a plurality of blades 64. Each of the blades 64 of this embodiment are fixedly coupled to an impeller hub 66 at one end and include a paddle 68 formed at the opposite end. The impeller hub 66 is fixedly coupled to a shaft 48 as in the previously discussed embodiments. Those skilled in the art would recognize that the quantity of the blades 64 and the size of the impeller 18 could vary depending on the application.

Figure 6:
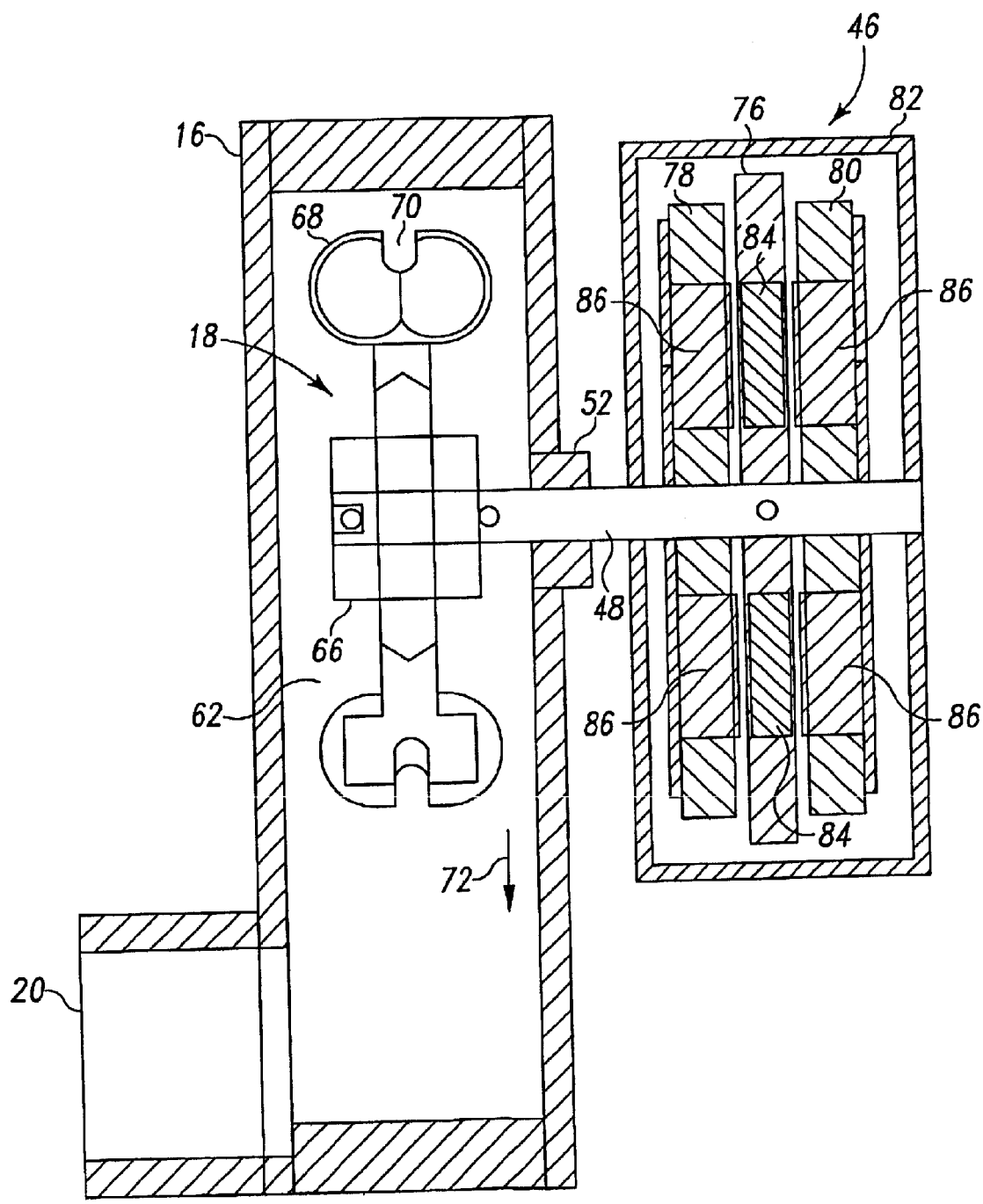
FIG. 6 illustrates the hydro-power generation system illustrated in FIG. 4 rotated 90 degrees with a portion of the hydro-power generation system sectioned away.

FIG. 6 illustrates the embodiment hydro-power generation system 12 illustrated in FIG. 5 rotated 90 degrees with a portion of the housing 16 sectioned away for illustrative purposes. As illustrated, the hydro-power generation system 12 includes the housing 16 coupled to the generator 46 with the shaft 48 as in the previously discussed embodiments. In addition, the shaft 48, which is rotatable, longitudinally extends from the impeller 18 into the generator 46 through the watertight seal 52. In an alternative embodiment, the shaft 48 could be modified with a magnetic coupler, as previously described, thereby eliminating the penetration of the housing 16 and the watertight seal 52. As illustrated, the shaft 48 rotatable positions the impeller 18 in the airspace within the housing cavity 62 with the paddles 68 thereby rotating about the shaft 48.

As illustrated in FIG. 6, each of the paddles 68 of this embodiment are formed in a parabolic shape that includes a slot 70. The parabolic shape of the paddles 68 provide a uniform receiver of the energy present in the water spraying from the nozzle 14 (illustrated in FIG. 5). The slots 70 allow the energy of the spraying water to pass to the next paddle 68 as the impeller 18 rotates. The transitional passing of the energy in the spraying water to the next paddle 68 maximizes the efficiency of the energy transfer from the water to the impeller 18. In alternative embodiments, the blades 64 could be formed in other shapes and configurations that are conducive to the efficient transfer of energy from other fluids sprayed from the nozzle 14. For example, when the fluid is air, the blades 64 may be formed as vanes, fins or other similar structure capable of translating the energy from the flowing air to the rotation of the impeller 18.

During operation, after the stream of water strikes the impeller 18 at a predetermined angle, the water falls by gravity as indicated by arrow 72 toward the housing outlet 20. As such, the water collects at the housing outlet 20 and is thereby channeled out of the housing 16. Since the impeller 18 is not submerged in water, the bulk of the energy transferred from the water stream to the impeller 18 is provided as rotational force to the shaft 48.

The rotation of the shaft 48 causes rotation of a portion of the generator 46. One embodiment of the generator 46 includes a rotor 76, a first stator 78, and a second stator 80 positioned within a generator housing 82. The rotor 76 is fixedly coupled to the shaft 48 and rotates therewith. The first and second stators 78, 80 are fixedly coupled to the generator housing 82 and circumferentially surround the shaft 48. The rotor 76 is positioned between the first and second stators 78, 80 to form the generator 46.

The rotor 76 of this embodiment may be in the form of a disk that includes a plurality of permanent magnets 84. The permanent magnets 84 are uniformly place in predetermined positions within the rotor 76 to operatively cooperate with the first and second stators 78, 80. Each of the first and second stators 78, 80 in this embodiment may also form disks that include a plurality of coils 86. The coils 86 are positioned uniformly within the first and second stators 78, 80 to operatively cooperate with the permanent magnets 84. The coils 86 may be electrically connected to form one or more windings that are operable to generate electricity. The number of poles and the design of the first and second stators 78, 80 are dependent on a number of factors. The factors include: the strength of the gaussian field formed by the permanent magnets 84 and the back EMF, as well as the desired RPM and the desired power output of the generator 46.

In this embodiment, the rotation of the rotor 76 causes magnetic flux that is generated by the permanent magnets 84 to similarly rotate thereby producing electricity in the first and second stators 78, 80. The rotor 76 and the first and second stators 78, 80 operatively cooperate to generate alternating current (AC). The AC may be rectified and stabilized by the generator 46 to supply both AC and direct current (DC). In an alternative embodiment, the permanent magnets 84 may be positioned on the first and second stators 78, 80 such that the generator 46 is operable to generate direct current (DC). In another alternative embodiment, the generator 46 is similar to the generator 46 discussed with reference to FIG. 3.

During operation, pressurized water may be supplied from the water treatment system 10 (illustrated in FIG. 1) to the hydro-power generation system 12. As in the previous embodiments, alternative embodiments of the hydro-power generation system 12 may supply water to the water treatment system 10 or be positioned within the water treatment system 10. In this embodiment, water is supplied from the water treatment system 10 to the nozzle 14 as previously discussed.

Pressurized water flows through the nozzle 14 and sprays with high velocity into the housing cavity 62 thereby striking the paddles 68 on the impeller 18 at a predetermined angle of incidence. When the water strikes the paddles 68, the energy in the spraying water is translated to the impeller 18 causing rotation in a single direction. As the impeller 18 rotates, a portion of the spraying water also sprays through the slots 70 and strikes another of the paddles 68 on the impeller 18. Following the collision of the water with the paddles 68 and the accompanying transfer of energy, the water falls by gravity to the housing outlet 20 and flows out of the housing 16. Accordingly, the housing cavity 62 remains an airspace during operation and is not completely filled with water during operation.

The rotation of the impeller 18 causes rotation of the shaft 48 thereby rotating the rotor 76 of the generator 46. In this embodiment, the rotor 76 rotates at about 2400 revolutions-per-minute (RPM). Rotation of the rotor 76 induces the generation of electricity that is supplied to the water treatment system 10. As previously discussed, the range of the voltage level produced by the generator 46 is based on the range of velocity of the water flowing through the nozzle 14. Accordingly, the voltage range of the generator can be selected by selecting a predetermined range of velocity for the flowing water through the nozzle 14

Figure 7:
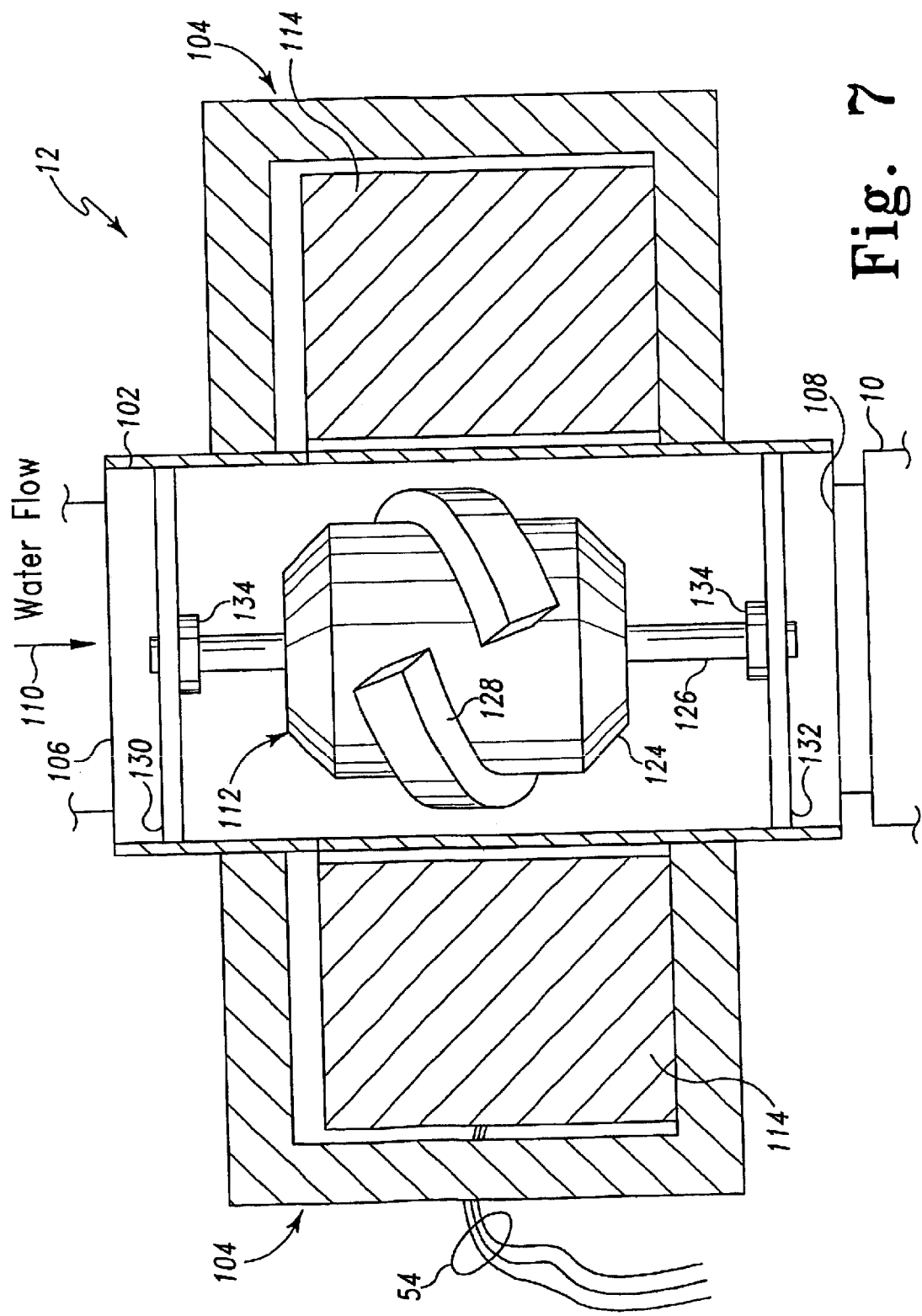
FIG. 7 represents a cross-sectional view of another embodiment of the hydro-power generation system coupled to the water treatment system.

FIG. 7 illustrates a cross-sectional view of another embodiment of the hydro-power generation system 12 which is preferentially coupled with the water treatment system 10. As illustrated, the hydro-power generation system 12 includes a rotor housing 102 and a stator housing 104. The rotor housing 102 forms a conduit that may be composed of plastic or other similar rigid material and includes an inlet 106 and an outlet 108. During operation the inlet 106 receives the flowing water as illustrated by arrow 110 and the outlet 108 channels the flowing water to the water treatment system 10. In alternative embodiments, the hydro-power generation system 12 may be positioned within the water treatment system 10 or positioned to receive water flowing out of the water treatment system 10. As previously discussed, the flow of water through the hydro-power generation system 12 may be controlled by the water treatment system 10.

As illustrated in FIG. 7, the rotor housing 102 contains a rotor 112 and the stator housing 104 contains a stator 114. The rotor 112 of this embodiment may be a twelve-pole permanent magnet rotor having six north/south pole combinations. As set forth in detail below, the stator 114 of this embodiment may be an annular ring designed with eight north/south pole combinations. The rotor 112 and the stator 114 cooperatively operate to produce electricity during operation. As known in the art, a stator contains a stationary winding that can be configured to contain any number of poles depending on the magnitude of the voltage needed at the output. The number of poles in the winding disclosed in the present embodiment should not be construed as a limitation on the present invention.

Figure 8:
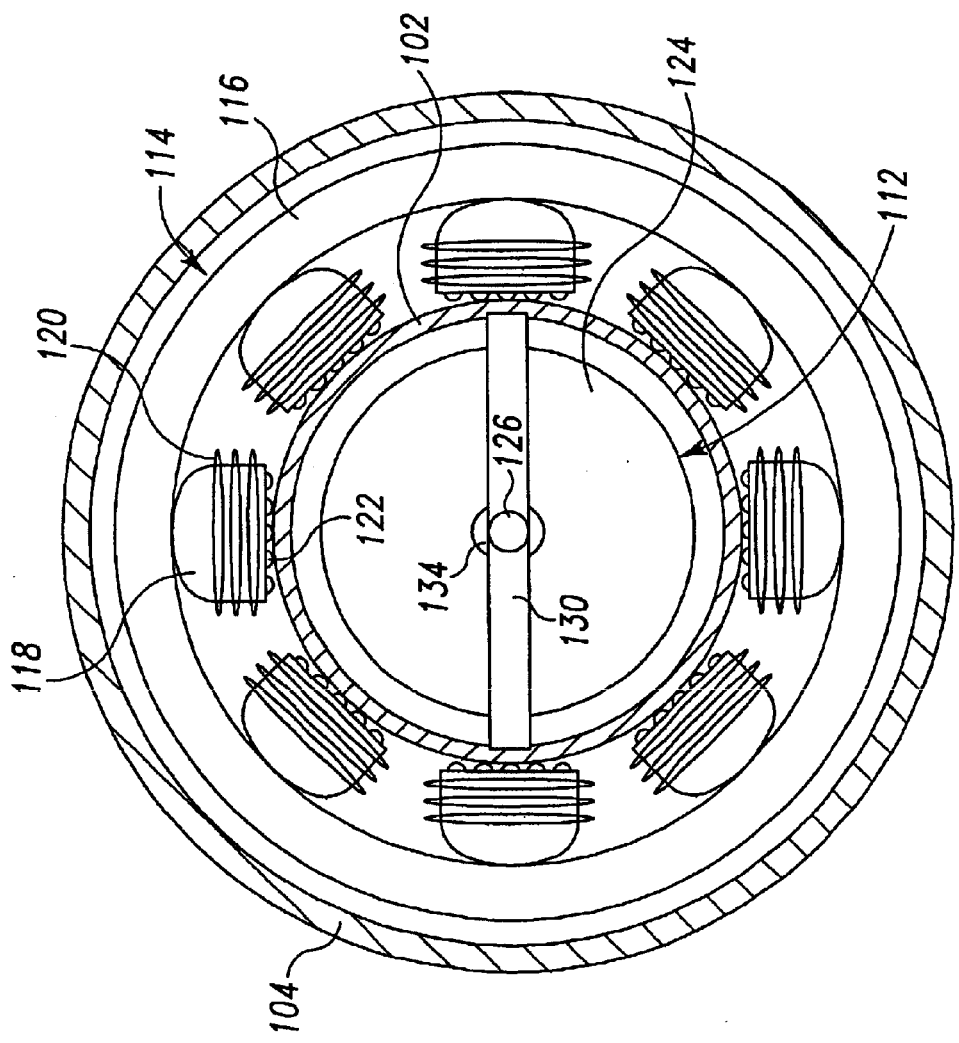
FIG. 8 represents a top view of the embodiment of the hydro-power generation system illustrated in FIG. 7 with a portion of the stator housing sectioned away.

FIG. 8 illustrates a top view of the embodiment depicted in FIG. 7 with the top portion of the stator housing 104 sectioned away for illustrative purposes. The stator 114 is fixedly positioned in the stator housing 104 to circumferentially surround the rotor housing 102. The stator 114 includes a core 116, a plurality of salient poles 118 and a plurality of coils 120. The core 116 may be composed of iron, steel or other similar material and is formed to include the salient poles 118. In this embodiment, there may be eight salient poles 118 that are each surrounded by coils 120.

The salient poles 118 are formed on the stator 114 such that they circumferentially surround the rotor housing 102. Each of the salient poles 118 includes a formed end that is known in the art as a pole shoe 122. The pole shoes 122 are located adjacent the rotor housing 102. The pole shoes 122 conduct a constant magnetic flux formed by the rotor 112 through the coils 120. The coils 120 may be wire or some other similar material capable of conducting electricity and being wrapped around the salient poles 118. Although not illustrated, the coils 120 are electrically connected to form the winding. As known in the art, the number of turns of wire used for each coil 120 is determined by the voltage and power requirements, the minimum and maximum revolutions of the rotor 112, the maximum allowable backpressure, the required inductance and the magnetic gauss.

Referring again to FIG. 7, the stator 114 is transversely positioned perpendicular to the central axis of the rotor housing 102. Since the stator 114 is positioned outside the rotor housing 102, it is isolated from fluid communication with the water flowing within the rotor housing 102. The stator housing 104 is fixedly coupled to the rotor housing 102 thereby providing a predetermined position on the rotor housing 102 for the stator 114. In this embodiment, the stator housing 104 is coupled with the external surface of the rotor housing 102 by a friction fit. Those skilled in the art would recognize that various other ways of coupling the rotor housing 102 and the stator housing 104 exist.

In this embodiment of the hydro-power generation system 12, the rotor 112 includes a permanent magnet 124 that can be formed of metal, sintered metal, extruded metal or ceramic material. The permanent magnet 124 forms a constant magnetic flux and is coupled with a rotor shaft 126. The rotor shaft 126, which is rotatable, longitudinally extends from opposite ends of the permanent magnet 124 and may be composed of stainless steel or other rigid, corrosion resistant material. The permanent magnet 124 is formed with its central axis coaxial with the rotor shaft 126. The outer surface of the permanent magnet 124 may be formed in a streamline shape to include at least one rotor blade 128. The permanent magnet 124 of this embodiment is formed in a barrel shape with a single helical ridge forming the rotor blade 128. In alternative embodiments, the rotor blade 128 could be turbine blades or other similar devices capable of inducing rotation of the rotor 112 when subjected to flowing water.

As illustrated in FIG. 7, the rotor 112 is positioned within the rotor housing 102 coaxial with the central axis of the rotor housing 102. One end of the rotor shaft 126 of the rotor 112 is inserted in a first collar 130 and the other end of the rotor shaft 126 is inserted in a second collar 132. In this embodiment, the ends of the rotor shaft 126 increase in diameter to form a solid sphere to facilitate fastening to the first collar 130 and the second collar 132. The first collar 130 and the second collar 132 are formed of plastic or other similar material and create a transverse strut perpendicular to the central axis of the rotor housing 102. The first collar 130 and the second collar 132 each contain a bearing 134 or other similar device to allow the rotor shaft 126 to rotate freely. Additionally, the first collar 130 and the second collar 132 are coupled to the rotor housing 102 at a predetermined distance from each other such that the rotor 112 can be suspended therebetween.

The rotor 112 is positioned in the rotor housing 102 such that water flowing through the rotor housing 102 impinges upon the rotor blade 128 that forms a part of the rotor 112. The rotor blade 128 acts as a paddle, causing the flowing water to act on the rotor 112. The flowing water causes the rotor 112 to rotate in a single direction about the central axis of the rotor housing 102. The rotor 112 is positioned within the stator 114 such that the axis of the rotor 112 is concentric with that of the stator 114. The rotor 112 operatively cooperates with the stator 144 to form the generator.

During operation, as water is flowing and the rotor 112 is rotating, the constant magnetic flux generated by the rotor 112 also rotates and penetrates into the stator 114 thereby intrinsically creating power. An air gap of a specified distance must be maintained between the rotor 112 and the stator 114 to allow the constant magnetic flux from the rotor 112 to induce the generation of electricity from the stator 114. In these embodiments, the "air gap" between the permanent magnet 124 of the rotor 112 and the pole shoes 122 of the stator 114 consists of flowing water and the rotor housing 102. The flow of fluid and the rotor housing 102 do not affect the constant magnetic flux. Accordingly, the rotating constant magnetic flux from the rotating rotor 112 induces the production of electricity from the coils 120 of the stator 114.

As the water flows through the rotor housing 102 causing the rotor 112 to rotate, the rotating constant magnetic flux is imparted on the winding of the stator 114 and electricity is produced. The electricity flows through conductors 54 to power a device which is a water treatment system 10 in this embodiment. The hydro-power generation system 12 of this embodiment illustrated in FIGS. 7 and 8 produces alternating current (AC) that may be used to power the water treatment system 10. In an alternative embodiment, the hydro-power generation system 12 may produce direct current (DC) by positioning the permanent magnet 124 on the stator 114. In another alternative embodiment, the hydro-power generation system 12 supplies both AC and DC current to the water treatment system 10 by rectifying and stabilizing the alternating current (AC). The DC current may also be used to charge a energy storage device (not shown). The rotation of the rotor 112 and the duration that electricity is produced may also be used to provide flow-based measurements such as, the flow rate or the quantity of water flowing through the water treatment system 10.

Figure 9:
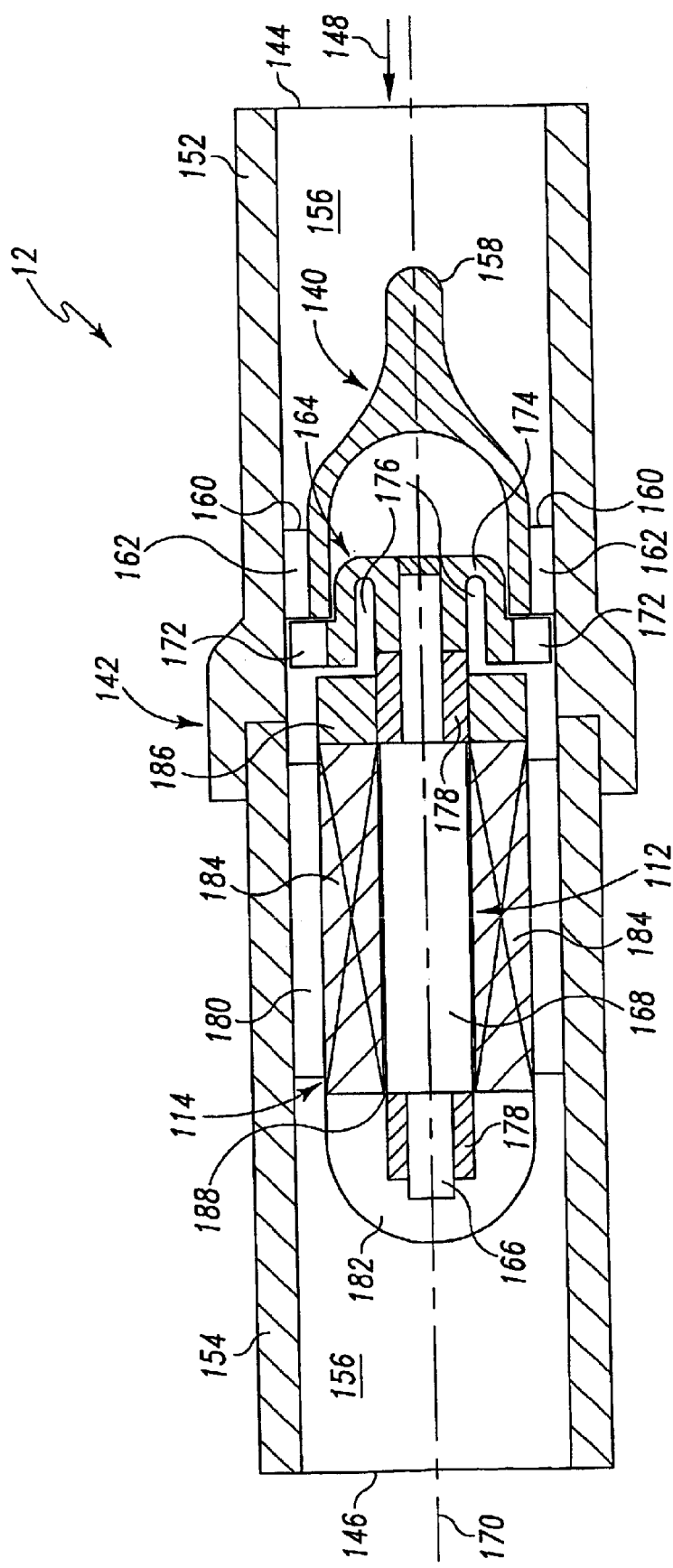
FIG. 9 represents a cross-sectional view of another embodiment of the hydro-power generation system.

FIG. 9 illustrates a cross-sectional view of yet another embodiment of the hydro-power generation system 12 that is similar in concept to the previous embodiment disclosed with respect to FIGS. 7 and 8. This embodiment includes a rotor 112, a stator 114 and a turbine nozzle 140 positioned in a housing 142. The housing 142 forms a conduit that includes an inlet 144 and an outlet 146. As water or some other fluid flows into the inlet 144 as illustrated by arrow 148, the water flows through the housing 142 and is channeled out of the housing 142 by the outlet 146. In one embodiment, the hydro-power generation system 12 may be positioned within a water treatment system 10 (illustrated in FIG. 1), following the water treatment system 10 or supplying water to the water treatment system 10.

The housing 142 may be formed of plastic or similar rigid material capable of channeling water. The housing 142 of this embodiment includes a first section 152 and a second section 154 to facilitate assembly and maintenance. The first and second sections 152, 154 may be fixedly coupled by gluing, friction fit, threaded connection or some other means of providing a similar rigid connection. The housing 142 forms a passageway 156 for the flow of water therethrough. Fixedly positioned within the passageway 156 is the turbine nozzle 140.

The turbine nozzle 140 of this embodiment may be generally conical in shape and may be formed of plastic or some other similar rigid material. The turbine nozzle 140 may be integrally formed to include a tip 158 and a plurality of struts 160. The tip 158 may be centrally located in the passageway 156 and serves to direct the flowing water outwardly toward the inner wall of the housing 142. The struts 160 are fixedly coupled to the inner wall of the housing 142 by, for example friction fit, snap-fit, threaded connection or other similar rigid connection.

The struts 160 fixedly hold the turbine nozzle 140 in the passageway 156 and include a plurality of channels 162 to allow water to flow through the housing 142. The size of the channels 162 may be adjusted to control the velocity of the flowing water. As in the nozzle 14, previously discussed with reference to FIG. 2, a predetermined range of velocity can be determined. The predetermined range of velocity is based on the expected pressure range of the water flowing in the inlet 144 as well as the backpressure of the hydro-power generation system 12. In addition, the struts 160 may be oriented in a predetermined configuration to act as vanes to direct the flowing water. The flowing water may be directed, for example, to act upon the rotor 112 in a predetermined way, to eliminate turbulence, to adjust pressure drop or to increase the efficiency of operation.

The rotor 112 of this embodiment includes a turbine rotor 164, a rotor shaft 166 and a permanent magnet 168. The rotor 112 is rotatably positioned within the passageway 156 such that water flowing in the passageway 156 causes rotation of the rotor 112 about a central axis 170 of the housing 142. Rotation of the rotor 112 occurs when the flowing water acts upon the turbine rotor 164. The turbine rotor 164 may be formed of stainless steel, aluminum, plastic or other similar rigid material that is capable of withstanding the rotational forces and the force of the flowing water. The turbine rotor 164 includes at least one turbine blade 172 and a body 174.

The turbine blade 172 is positioned to receive energy from water flowing through the struts 160. The turbine blade 172 may be a plurality of vanes, a helical ridge or other mechanism formed on the body 174 that is capable of converting the energy of the flowing water to rotational energy. The turbine blade 172 of this embodiment is integrally formed with the body 174 and extends until positioned adjacent the inner wall of the housing 142. The body 174 may be formed to define a cavity 176 that circumferentially surrounds a portion of the rotor shaft 166. It should be noted by the reader that the depth of the channels 162 are less than the depth of the turbine blade 172 with respect to the inner wall of the housing 142. The differential depth provides circulation of the flowing water as will be hereinafter discussed.

The rotor shaft 166 is rotatable and may be integrally formed with the turbine rotor 164 or, the rotor shaft 166 may be fixedly coupled thereto by press-fit, threaded connection or similar coupling mechanism. The rotor shaft 166 may be stainless steel or other similar rigid material that may longitudinally extend through the permanent magnet 168. The permanent magnet 168 may be an extruded magnet that may be formed of metal, sintered metal, ceramic material or some other similar material with magnetic properties. The permanent magnet 168 may be fixedly coupled to the rotor shaft 166 by friction fit, molding or other similar mechanism. The rotor 112 is rotatable held in position by a plurality of bearings 178.

The bearings 178 circumferentially surround a portion of the rotor shaft 166 at opposite ends of the permanent magnet 168. The bearings 178 may be carbon graphite, Teflon, ball bearings, ceramic, ultra high molecular weight (UHMW) polethelyne or other similar bearings capable of withstanding the rotation of the rotor shaft 166. In this embodiment, the bearings 178 are lubricated by water present in the passageway 156. In addition, the flowing water is operable to cool the bearings 178 as will be hereinafter described. The bearings 178 are fixedly coupled and held in position by the stator 114.

The stator 114 of this embodiment includes a plurality of exit guide vanes 180, a fin 182, a plurality of coils 184 and a cap 186. As illustrated in FIG. 9, the stator 114 is fixedly positioned in the passageway 156 by the exit guide vanes 180. The exit guide vanes 180 are fixedly coupled with the inner wall of the housing 142 by, for example, glue, friction fit, snap fit or similar rigid coupling mechanism. The exit guide vanes 180 longitudinally extend parallel with the inner wall of the housing 142 and provide channels for the flow of water therethrough. The exit guide vanes 180 are formed to channel the flowing water to the outlet 146 to reduce turbulence, air bubbles, back pressure and other similar behavior of the flowing water that may effect efficient operation. The fin 182 is similarly formed to channel the flowing water to the outlet 146.

The coils 184 are formed on a core (not shown) to circumferentially surround the rotor 112 and form a winding. The coils 184 are separated from the rotor 112 by an air gap 188. The coils 184 are fixedly coupled with the exit guide vanes 180. In addition, the coils 184 may be fixedly coupled with the bearings 178 and the fin 182. The coils 184 may be fixedly coupled to the exit guide vanes 180, the bearings 178 and the fin 182 by, for example, glue or by being integrally formed therewith. In this embodiment, the coils 184 are positioned within the passageway 156, but are waterproof to avoid fluid communication with the flowing water. The coils 184 may be made waterproof by being, for example, potted with epoxy, injection molded with rubber or plastic, ultrasonically sealed or otherwise isolated from the water by a similar waterproofing mechanism. In an alternative embodiment, the coils 184 may be located outside the housing 142 as in the embodiment previously discussed with reference to FIGS. 7 and 8.

The coils 184 are also water proofed by the cap 186. The cap 186 is positioned to seal the end of the coils 184 that is adjacent the turbine rotor 164 as illustrated in FIG. 9. The cap 186 may be removably coupled to the coils 184 by threaded connection or may be fixedly coupled to the coils 184 by glue or integral formation therewith. The cap 186 is formed to partially surround the bearing 178 and radially extend a predetermined distance that is equal to the radius of the stator 114. The predetermined distance of the cap 186 extends closer to the inner wall of the housing 142 than the body 174 of the turbine rotor 164. The difference in the distance from the inner wall of the housing 142 to the cap 186 and the body 174 provides for circulation of the flowing water as will be hereinafter discussed.

During operation, water flowing through the inlet 144 and into the passageway 156 experiences a predetermined increase in velocity as the pressurized water flows through the channels 162. The flowing water is directed by the struts 160 to achieve a predetermined angle of incidence on the turbine blade 172 that imparts rotation on the rotor 112. In this embodiment, the rotor 112 rotates at about 15,000 revolutions-per-minute (RPM). Due to the differential depth of the channel 162, the turbine blade 172 and the cap 182, the flowing water is circulated into the cavity 176. Circulation of the flowing water through the cavity 176 provides cooling and lubrication of the adjacently positioned bearing 178.

The revolution of the rotor 112 within the stator 114 produces electricity when the hydro-power generation system 12 is operating. The hydro-power generation system 12 is capable of generating alternating current (AC). In alternative embodiments, the hydro-power generation system 12 may produce (DC) current if the permanent magnet 168 is positioned on the stator 114. In another alternative embodiment, the hydro-power generation system 12 may be designed to produce both AC current and DC current by rectification and stabilization of the AC current. As previously discussed, the number of poles and the size and configuration of the coils 184 is dependent on the back pressure, the required RPM's and the target energy output of the hydro-power generation system 12.

Referring now to FIGS. 3, 6, 7, 8 and 9, another embodiment of the hydro-power generation system 12 discussed in conjunction with the embodiments of these figures is operable to supply multiple voltage and current levels. The multiple voltage and current levels are supplied by switching the coils of the hydro-power generation system 12 between a series configuration and a parallel configuration. Although not illustrated, a microprocessor or other similar control unit that can sense the voltage and current output of the hydro-power generation system 12 and the present voltage and current needs of the water treatment system 10 may be used to selectively switch the coils between series and parallel configurations. Selective switching of the coils may be applied to embodiments that produces direct current (DC) or alternating current (AC).

For example, some ultraviolet (UV) light sources require a relatively low predetermined alternating current for initial energization and a relatively high voltage level. Following initial energization, the UV light source requires a relatively high alternating current but requires a relatively low voltage level to remain energized. Accordingly, during operation, when the hydro-power generation system 12 is generating electricity, the coils are selectively placed in a series configuration by the microprocessor. The series configuration generates a predetermined alternating current at a predetermined voltage level that is capable of initially energizing the UV light source. Following initial energization of the UV light source, the coils are selectively reconfigured to a parallel configuration to provide a predetermined alternating current at a predetermined voltage level capable of maintaining energization of the UV light source. Switching the coils of the hydro-power generation system 12, as previously discussed, may provide for various voltage and current requirements of any electrical device in the water treatment system 10.

In another embodiment, the hydro-power generation system 12 discussed in conjunction with the previously discussed embodiments may be provided with a plurality of taps representing different groups of coils formed into windings. The taps are operable to supply a plurality of different predetermined voltage levels by electrically connecting different numbers of coils to form the windings. The water treatment system 10 may be configured to operatively switch between the taps during operation using a microprocessor or some other similar device. Accordingly, in the UV light source example previously discussed, one tap may be used for initial energization and another tap may be used for continuous operation. In addition, different taps may be used on an ongoing basis to operate different electrical devices in the water treatment system 10 depending on the power requirements of the electrical devices.

In yet another embodiment of the hydro-power generation system 12 discussed in conjunction with the previously discussed embodiments, the back electromagnetic force (EMF) that is present is advantageously reduced. As known in the art, the back EMF of a permanent magnet generator is increased by flux concentrators that are formed by metal laminations in the core of the generator. The flux concentrators are operable to improve the generating efficiency of the generator, but supply back EMF that must be overcome to rotate the rotor.

In the application of the hydro-power generation system 12 to a water treatment system 10, some UV light sources have varying power requirements during startup and operation. By using the previously discussed embodiments of the hydro-power generation system 12 and not include the flux concentrators, the operational requirements of the UV light source may be met.

During operation, prior to energization of the water treatment system 10, the rotational load (the back EMF) on the hydro-power generation system 12 may be relatively low. The rotational load may be relatively low since the hydro-power generation system 12 of this embodiment does not include the flux concentrators and the water treatment system 10 is not using power. As such, when water flows through the hydro-power generation system 12, the rotor is operable to accelerate to a predetermined relatively high RPM in a relatively short period of time.

The relatively high RPM supplies a predetermined voltage at a predetermined alternating current (AC) that is capable of initially energizing, for example, the UV light source in the water treatment system 10. Following initial energization of the UV light source, the rotational load on the hydro-power generation system 12 is increased thereby slowing the RPM of the rotor. The slower RPM of the rotor provides a predetermined low voltage with a corresponding predetermined alternating current (AC) thereby allowing continued energization of the UV fight source. The reader should recognize that the "instant-on" capability provided by the hydro-power generation system 12 of this embodiment may eliminate the need for energy storage devices to power the UV light source in the water treatment system 10.

The present preferred embodiments of the hydro-power generation system 12 provide a stand alone source of electricity for the water treatment system 10. The hydro-power generation system 12 provides an efficient conversion of the energy present in water flowing through the water treatment system 10 to electrical energy. The electrical energy may be supplied by the embodiments of the hydro-power generation system 12 to meet the particular energy needs of the water treatment system 10. As those skilled in the art would recognize, application of the hydro-power generation system 12 is not limited to water treatment systems 10 and could be advantageously applied for other fluids such as, for example, air.

While the present invention has been described with reference to specific exemplary embodiments, it will be evident that various modifications and changes may be made to these embodiments without departing from the spirit and scope of the invention. It is the following claims, including all equivalents, that are intended to define the spirit and scope of the invention.

What is claimed is:

1. A hydro-power generation system, comprising:
  a housing that includes an inner wall that defines a passageway having an inlet and an outlet, wherein the cross-sectional area of the passageway is substantially uniform between the inlet and the outlet;
  a rotor concentrically positioned within the passageway such that the rotor is rotated by a flow of liquid through the passageway;
  a turbine nozzle fixedly coupled with the housing and concentrically positioned near the inlet of the passageway, wherein the turbine nozzle comprises a tip and a plurality of struts, the tip configured to increase the velocity of the flow of liquid by diversion of the liquid outwardly toward the inner wall, and the struts configured to direct the flow of liquid through a plurality of channels to the rotor; and
  a stator fixedly positioned to surround the rotor such that rotation of the rotor induces the production of electricity.

2. The hydro-power generation system of claim 1, wherein the turbine nozzle is operable to increase the velocity of the liquid and direct the flow of liquid to achieve a predetermined angle of incidence of the liquid upon the rotor.

3. The hydro-power generation system of claim 1, wherein the rotor comprises a shaft and a turbine rotor.

4. The hydro-power generation system of claim 3, wherein the turbine rotor includes a helical ridge.

5. The hydro-power generation system of claim 3, wherein the turbine rotor includes a plurality of vanes.

6. The hydro-power generation system of claim 1, wherein the stator is fixedly positioned to surround the housing adjacent the rotor.

7. The hydro-power generation system of claim 1, wherein the stator is fixedly positioned within the passageway to surround the rotor.

8. The hydro-power generation system of claim 1, wherein the electricity is alternating current.

9. The hydro-power generation system of claim 8, wherein the rotor comprises a permanent magnet.

10. The hydro-power generation system of claim 8, wherein the alternating current is rectified to provide direct current.

11. The hydro-power generation system of claim 1, wherein the electricity is direct current.

12. The hydro-power generation system of claim 11, wherein the stator comprises a permanent magnet.

13. The hydro-power generation system of claim 1, further comprising a plurality of taps representative of coils included in at least one of the stator and the rotor and an ultraviolet light source energized with the electricity produced, wherein the taps are dynamically operable to provide different voltage levels of electricity to initially energize and continue to energize the ultraviolet light source.

14. The hydro-power generation system of claim 1, further comprising an ultraviolet light source and a plurality of coils included in at least one of the stator and the rotor, wherein the ultraviolet light source is energized with the electricity produced, and the coils are dynamically switchable from a parallel configuration to a series configuration to provide a first voltage for initial energization and a second voltage for continued energization of the ultraviolet light source.

15. The hydro-power generation system of claim 1, wherein the hydro-power generation system is operable without flux concentrators to accelerate to a first RPM to initially energize an ultraviolet light source with a first voltage, wherein continued energization of the ultraviolet light source is operable to slow station of the hydro-power generation system to a second RPM and produce a second voltage.

16. The hydro-power generation system of claim 1, wherein the rotation of the rotor is operable to provide flow-based measurements of the liquid.

17. The hydro-power generation system of claim 1, wherein the inlet is supplied liquid from a faucet mounted water treatment system.

18. The hydro-power generation system of claim 1, wherein the stator comprises a plurality of exit guide vanes and a fin, the exit guide vanes and the fin cooperatively operable to channel the flow of liquid to the outlet, wherein the alignment of the exit guide vanes with the channels form a substantially straight path for the flow of liquid through the passageway.

19. The hydro-power generation system of claim 1, wherein the housing comprises a first section and a second section, the first section detachably coupled with the second section to facilitate assembly and maintenance.

20. The hydro-power generation system of claim 19, wherein the rotor and stator are disposed in the second section and the turbine nozzle is disposed in the first section.

21. The hydro-power generation system of claim 1, wherein the liquid is drinking water.

22. A method of supplying electricity using a flow of liquid, the method comprising:
providing a housing that includes a passageway having an inlet and an outlet, wherein the passageway has a substantially uniform cross sectional area between the inlet and the outlet;
supplying the flow of liquid to the inlet of the passageway, wherein the liquid flows through the passageway to the outlet;
rotating a rotor that is positioned in the passageway such that the rotor is surrounded by a stator, wherein the rotor rotates as a result of the liquid flowing through the passageway;
directing the flow of liquid outward towards an inner wall of the passageway with a tip of a turbine nozzle to increase the velocity of the flow of liquid;
directing the flow of liquid to the rotor through a plurality of channels formed with a plurality of struts included with the turbine nozzle to further increase the velocity of the flow of liquid; and
generating electricity with the rotor and the stator, wherein rotation of the rotor induces the generation of electricity.

23. The method of claim 22, wherein the electricity generated is alternating current.

24. The method of claim 23, further comprising the act of rectifying the alternating current to provide direct current.

25. The method of claim 22, wherein the electricity generated is direct current.

26. The method of claim 22, further comprising the act of charging an energy storage device.

27. The method of claim 22, further comprising the act of channeling the liquid to the outlet with a plurality of exit guide vanes.

28. The method of claim 22, further comprising the act of circulating the liquid to a bearing to cool and lubricate the bearing.

29. The method of claim 22, further comprising the act of dynamically adjusting the voltage and current levels of the electricity with a plurality of coils included in at least one of the stator and the rotor in response to initial energization and continued energization of an ultraviolet light source by the electricity generated.

30. The method of claim 29, further comprising the act of switching the coils between a parallel configuration and a series configuration.

31. The method of claim 29, further comprising the act of electrically connecting the coils with a plurality of taps to provide a plurality of voltage levels.

32. The method of claim 22, further comprising the acts of accelerating the hydro-power generation system in the absence of flux concentrators to a first RPM to initially energize an ultraviolet light source; and slowing the hydro-power generation system to a second RPM and a second voltage by continued energization of the ultraviolet light source.

33. The method of claim 22, comprising the initial of adjusting the struts to control the velocity of the flow of liquid.

34. The method of claim 22, comprising the initial act of adjusting the struts in order to adjust at least one of the angle of incidence of the liquid on the rotor, efficiency, turbulence and pressure drop.

35. A hydro-power generation system comprising:
a housing having an inner wall that defines a passageway, the passageway having an inlet and an outlet and configured to accommodate a flow of liquid through the housing;
a turbine nozzle positioned concentrically in the passageway, wherein the turbine nozzle includes a tip positioned near the inlet that is configured to divert the flow of liquid outwardly toward the inner wall and a plurality of struts operable in conjunction with the inner wall to form a plurality of inlet channels to channel the diverted flow of liquid;
a rotor comprising a turbine rotor coupled with a generator rotor by a shaft, the rotor positioned concentrically in the passageway downstream of the turbine nozzle so that the flow of liquid through the inlet channels is directed to the turbine rotor; and
a generator stator concentrically positioned to surround the generator rotor, the generator stator coupled with the inner wall by a plurality of exit guide vanes that are operable in conjunction with the inner wall to form a plurality of exit channels, wherein the inlet channels are aligned with the exit channels to form a substantially straight flow path for the flow of liquid through the passageway.

36. The hydro-power generation system of claim 35, further comprising a bearing rotatably coupled with the shaft and fixedly coupled with the generator stator, wherein the turbine rotor comprises a turbine blade rotatably positioned adjacent to the inlet channels and the depth of the turbine blade is greater than the depth of the inlet channels to provide circulation of a portion of the flow of liquid to cool and lubricate the bearing.

37. The hydro-power generation system of claim 35, wherein the housing comprises a first section detachably coupled with a second section, the turbine nozzle disposed in the first section, and the rotor and the generator stator disposed in the second section.

38. The hydro-power generation system of claim 35, wherein the rotor is configured to rotate at about 15,000 revolutions-per-minute.

39. The hydro-power generation system of claim 35, wherein the generator rotor is a permanent magnet and the generation stator comprises a plurality of coils.

40. The hydro-power generation system of claim 35, wherein the passageway comprises a cylinder having a substantially uniform cross sectional area between the inlet and the outlet.

41. The hydro-power generation system of claim 35, wherein the tip comprises a rounded protuberance extending from near the inlet towards the outlet.

42. The hydro-power generation system of claim 41, wherein the diameter of the tip increases toward the outlet.

43. The hydro-power generation system of claim 35, wherein the housing is configured to be mounted in a faucet mounted water treatment system.

44. The hydro-power generation system of claim 35, wherein the turbine nozzle, the rotor and the generator stator are immersible in and surrounded by the flow of liquid through the passageway.

45. The hydro-power generation system of claim 35, further comprising an ultraviolet light source coupled with the generator stator, wherein the generator stator is configured to provide capability to start the ultraviolet light source so that, upon initial rotation of the generator rotor by the flow of liquid, the generator stator generates a start voltage capable of initial energization of the ultraviolet light source.

46. The hydro-power generation system of claim 45, wherein the generator stator is configured to generate a running voltage to maintain energization of the ultraviolet light source when rotation of the generator rotor slows due to increased rotational loading of the generator rotor as a result of the initial energization of the ultraviolet light source.

47. A hydro-power generation system, comprising:
- a housing that includes an inner wall that defines a passageway having an inlet and an outlet, wherein the cross-sectional area of the passageway is substantially uniform between the inlet and the outlet;
- a rotor concentrically positioned within the passageway such that the rotor is rotated by a flow of liquid through the passageway;
- a turbine nozzle fixedly coupled with the housing and concentrically positioned in the inlet of the passageway, wherein the turbine nozzle comprises a tip and a plurality of struts, the tip configured to increase the velocity of the flow of liquid by diversion of the liquid outwardly toward the inner wall, and the struts configured to direct the flow of liquid through a plurality of channels to the rotor;
- a stator fixedly positioned to surround the rotor such that rotation of the rotor induces the production of electricity, wherein at least one of the stator and the rotor comprises a plurality of coils; and
- an ultraviolet light source coupled with one of the stator and the rotor, wherein the coils are dynamically switchable to provide a first voltage for initial energization and a second voltage for continued energization of the ultraviolet light source.

48. The hydro-power generation system of claim 47, wherein the coils are dynamically switchable from a parallel configuration to a series configuration.

49. The hydro-power generation system of claim 47, wherein the coils comprise a plurality of taps, and the coils are dynamically switchable by dynamic selection of different taps.

50. The hydro-power generation system of claim 47, wherein the housing is configured to be disposed within and form part of a water treatment system.

51. The hydro-power generation system of claim 50, wherein the water treatment system is a faucet mounted water treatment system.

52. The hydro-power generation system of claim 50, wherein the water treatment system is an undercounter water treatment system.

53. The hydro-power generation system of claim 47, further comprising a microprocessor, the microprocessor configured to dynamically switch the coils in response to the current and voltage output of one of the stator and the rotor.

* * * * *

UNITED STATES PATENT AND TRADEMARK OFFICE
CERTIFICATE OF CORRECTION

| | |
|---|---|
| PATENT NO. | : 6,798,080 B1 |
| DATED | : September 29, 2004 |
| INVENTOR(S) | : David W. Baarman, Wesly J. Bachman and John J. Lord |

It is certified that error appears in the above-identified patent and that said Letters Patent is hereby corrected as shown below:

Column 16,
Line 62, change "station" to -- rotation --

Signed and Sealed this

First Day of February, 2005

JON W. DUDAS
*Director of the United States Patent and Trademark Office*